United States Patent
Baik et al.

(10) Patent No.: US 9,941,503 B2
(45) Date of Patent: Apr. 10, 2018

(54) RECHARGEABLE BATTERY HAVING IMPROVED CURRENT DENSITY

(71) Applicant: SAMSUNG SDI CO., LTD., Yongin-si, Gyeonggi-do (KR)

(72) Inventors: Yun-Ki Baik, Yongin-si (KR); Jong-Woo Nam, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 92 days.

(21) Appl. No.: 15/002,338

(22) Filed: Jan. 20, 2016

(65) Prior Publication Data

US 2017/0062792 A1    Mar. 2, 2017

(30) Foreign Application Priority Data

Aug. 25, 2015 (KR) .................. 10-2015-0119664

(51) Int. Cl.
  *H01M 2/26* (2006.01)
  *H01M 2/04* (2006.01)
  *H01M 2/06* (2006.01)

(52) U.S. Cl.
  CPC ......... *H01M 2/263* (2013.01); *H01M 2/0473* (2013.01); *H01M 2/06* (2013.01)

(58) Field of Classification Search
  CPC combination set(s) only.
  See application file for complete search history.

(56) References Cited

U.S. PATENT DOCUMENTS

| | | | | |
|---|---|---|---|---|
| 5,158,842 A | * | 10/1992 | McHenry | H01M 2/266 429/161 |
| 2006/0068275 A1 | * | 3/2006 | Chung | H01M 2/06 429/121 |
| 2006/0127751 A1 | * | 6/2006 | Woo | H01M 2/1653 429/161 |
| 2011/0020694 A1 | * | 1/2011 | Khakhalev | B23K 20/10 429/158 |
| 2011/0076533 A1 | * | 3/2011 | Choi | H01M 2/0426 429/94 |
| 2011/0129701 A1 | * | 6/2011 | Seo | H01M 2/263 429/94 |

(Continued)

FOREIGN PATENT DOCUMENTS

KR  10-2013-0064229 A   6/2013
KR  10-2013-0119457 A   10/2013

*Primary Examiner* — Imran Akram
(74) *Attorney, Agent, or Firm* — Lewis Roca Rothgerber Christie LLP (57) ABSTRACT

A rechargeable battery according to one or more exemplary embodiments includes: a pair of electrode assemblies, each including a first electrode including a coated region, a tab, and a connecting tab, a second electrode including a coated region, a tab, and a connecting tab, and a separator between the first electrode and the second electrode, the first electrode, the separator, and the second electrode being wound; a case accommodating the pair of electrode assemblies; a cap plate at an opening of the case and defining terminal openings; and first and second electrode terminals respectively connected to the tabs of the first and second electrodes and respectively passing through the terminal openings. The pair of electrode assemblies are electrically connected to each other via the connecting tabs.

8 Claims, 8 Drawing Sheets

(56) References Cited

U.S. PATENT DOCUMENTS

| | | | |
|---|---|---|---|
| 2012/0070721 A1* | 3/2012 | Han | H01M 2/0413 |
| | | | 429/163 |
| 2012/0094170 A1* | 4/2012 | Byun | H01M 2/263 |
| | | | 429/178 |
| 2013/0040191 A1* | 2/2013 | Kim | H01M 2/22 |
| | | | 429/179 |
| 2013/0196210 A1 | 8/2013 | Kim et al. | |
| 2013/0252053 A1* | 9/2013 | Woo | H01M 2/26 |
| | | | 429/94 |
| 2015/0010805 A1* | 1/2015 | Han | H01M 2/263 |
| | | | 429/149 |

\* cited by examiner

RECHARGEABLE BATTERY HAVING IMPROVED CURRENT DENSITY

CROSS-REFERENCE TO RELATED APPLICATION

This application claims priority to, and the benefit of, Korean Patent Application No. 10-2015-0119664 filed in the Korean Intellectual Property Office on Aug. 25, 2015, the entire contents of which are incorporated herein by reference.

BACKGROUND

1. Field

Embodiments of the present invention relate generally to a rechargeable battery.

2. Description of the Related Art

A rechargeable battery differs from a primary battery in that it is designed be repeatedly charged and discharged, while the latter is not designed to be recharged. Low-capacity rechargeable batteries are used in small portable electronic devices, such as mobile phones, notebook computers, and camcorders, while high-capacity rechargeable batteries can be used as a power source for driving motors of a hybrid vehicle, an electric vehicle, and the like.

For example, a rechargeable battery includes an electrode assembly for performing charging and discharging operations, a case housing the electrode assembly, a cap plate combined to an opening of the case, and electrode terminals through which the electrode assembly is drawn out of the cap plate.

The electrode terminals are connected to tabs of the electrode assembly, allowing the electrode assembly to be charged and discharged by a current. Accordingly, because current density is concentrated in areas of the tabs of the electrode assembly, which are connected to the electrode terminals, temperature deviations may be generated in the electrode assembly depending on distances from the electrode terminals and the tabs. That is, due to degradation in the areas of the electrode terminals and the tabs of the electrode assembly, the rechargeable battery may have a shorter service life, as well as a reduced output.

In addition, when the tabs of the plurality of electrode assemblies are electrically coupled to the electrode terminals, unbalanced charging and discharging may occur between the electrode assemblies. In this case, a temperature difference between the electrode assemblies may be generated.

The above information disclosed in this Background section is only to enhance the understanding of the background of the invention, and therefore it may contain information that does not form the prior art.

SUMMARY

One or more exemplary embodiments of the described technology relate generally to a rechargeable battery that can reduce (or minimize) a temperature difference between positions inside electrode assemblies by making current density uniform or substantially uniform in the electrode assemblies.

A rechargeable battery according to one or more exemplary embodiments of the present invention includes a pair of electrode assemblies, each including a first electrode including a coated region, a tab, and a connecting tab, a second electrode including a coated region, a tab, and a connecting tab, and a separator between the first electrode and the second electrode, the first electrode, the separator, and the second electrode being wound, a case accommodating the pair of electrode assemblies, a cap plate at an opening of the case and defining terminal openings, and first and second electrode terminals respectively connected to the tabs of the first and second electrodes and respectively passing through the terminal openings, wherein the pair of electrode assemblies are electrically connected to each other via the connecting tabs.

The connecting tabs may connect the pair of electrode assemblies in parallel.

The tabs of the first electrodes and the tabs of the second electrodes may be located near the cap plate, and the connecting tabs may be located at a side of the electrode assemblies opposite the cap plate.

The connecting tabs may be respectively drawn out of the pair of electrode assemblies to face each other, and respective ones of the connecting tabs may be bent, overlapped, and connected to each other.

The connecting tab may protrude from the pair of electrode assemblies in a direction opposite to that of the tabs.

The tabs of the first electrodes may be located at one side of the pair of electrode assemblies to be connected to the first electrode terminal, and the tabs of the second electrodes may be located at an opposite side of the pair of electrode assemblies to be connected to the second electrode terminal.

The rechargeable battery according to one or more exemplary embodiments may further include an insulating plate that is above the pair of electrode assemblies, and may define internal terminal openings that correspond to the terminal openings.

According to one or more exemplary embodiments of the present invention, the tabs and the connecting tabs can be provided in the first and second electrodes to electrically connect the pair of electrode assemblies, thereby uniformly (or substantially uniformly) connecting current densities of the electrode assemblies via the tabs and the connecting tabs of the first and second electrode terminals. Accordingly, the temperature difference between positions inside the electrode assemblies can be reduced (or minimized).

DETAILED DESCRIPTION

Embodiments of the present invention are described more fully hereinafter with reference to the accompanying drawings, in which exemplary embodiments of the invention are shown. As those skilled in the art would realize, the described embodiments may be modified in various different ways, all without departing from the spirit or scope of the present invention. The drawings and description are to be regarded as illustrative in nature and not restrictive. Like reference numerals designate like elements throughout the specification. In the drawings, the relative sizes of elements, layers, and regions may be exaggerated for clarity.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present invention. As used herein, the singular forms "a" and "an" are intended to include the plural forms as well, unless the context clearly indicates otherwise. It will be further understood that the terms "comprises," "comprising," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least two of," when preceding a list of elements, modify the entire list of elements and do not modify the individual elements of the list.

As used herein, the term "substantially," "about," and similar terms are used as terms of approximation and not as terms of degree, and are intended to account for the inherent deviations in measured or calculated values that would be recognized by those of ordinary skill in the art. Further, the use of "may" when describing embodiments of the present invention refers to "one or more embodiments of the present invention." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 1:
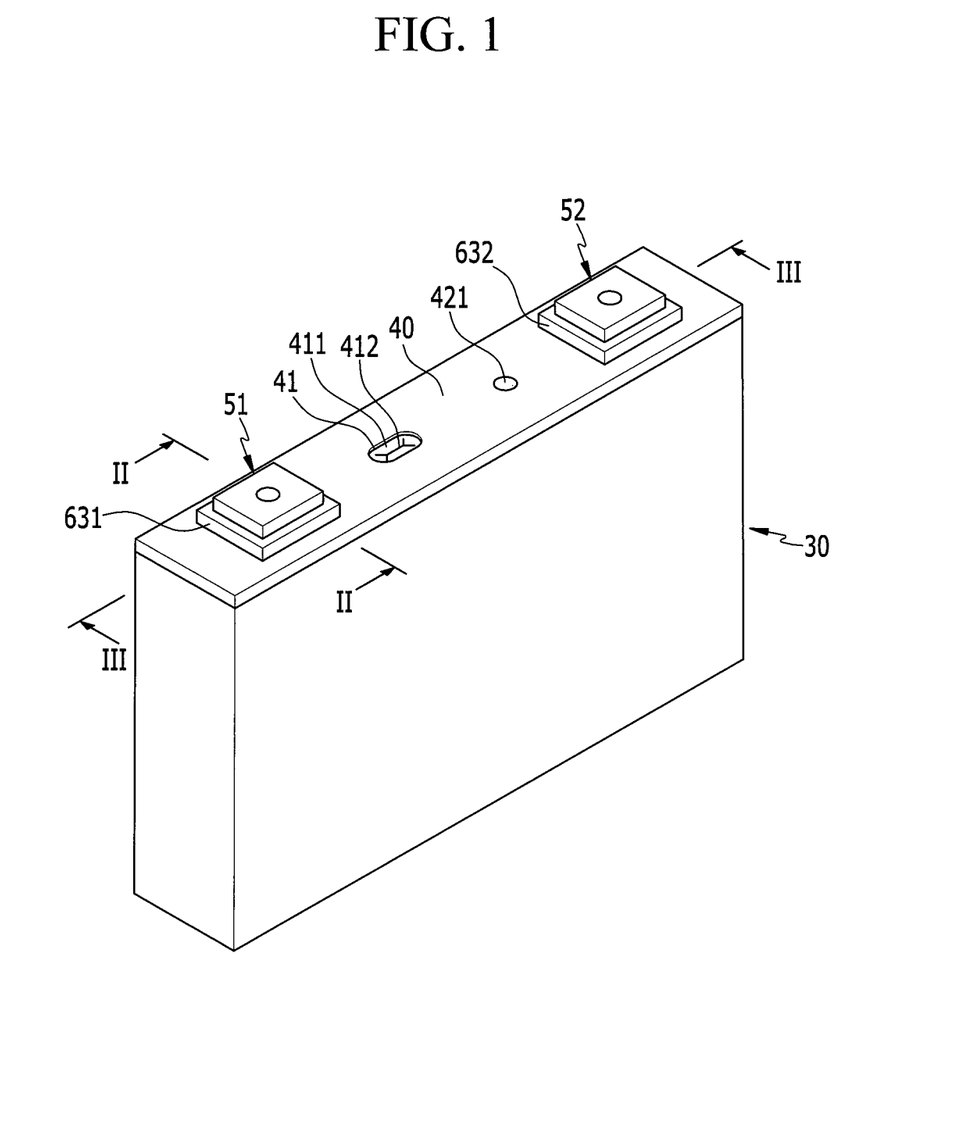
FIG. 1 is a perspective view of a rechargeable battery according to one or more exemplary embodiments of the present invention.
Figure 2:
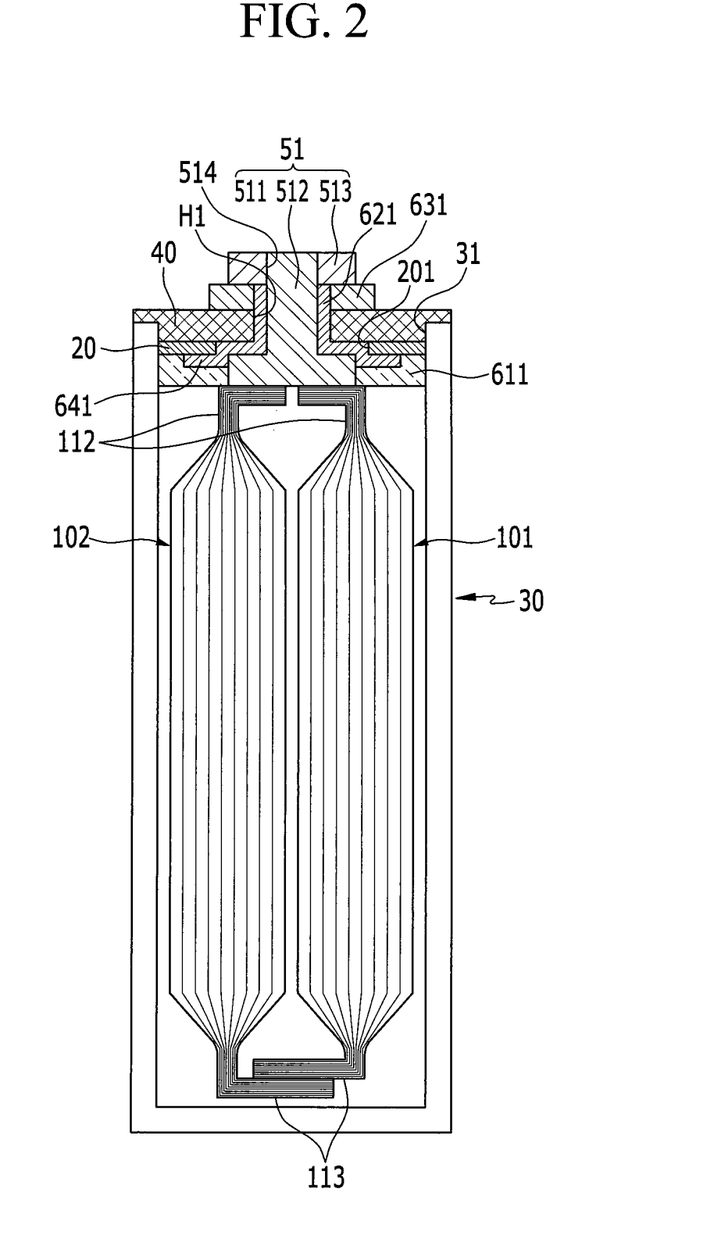
FIG. 2 is a cross-sectional view of FIG. 1 taken along the line II-II.
Figure 3:
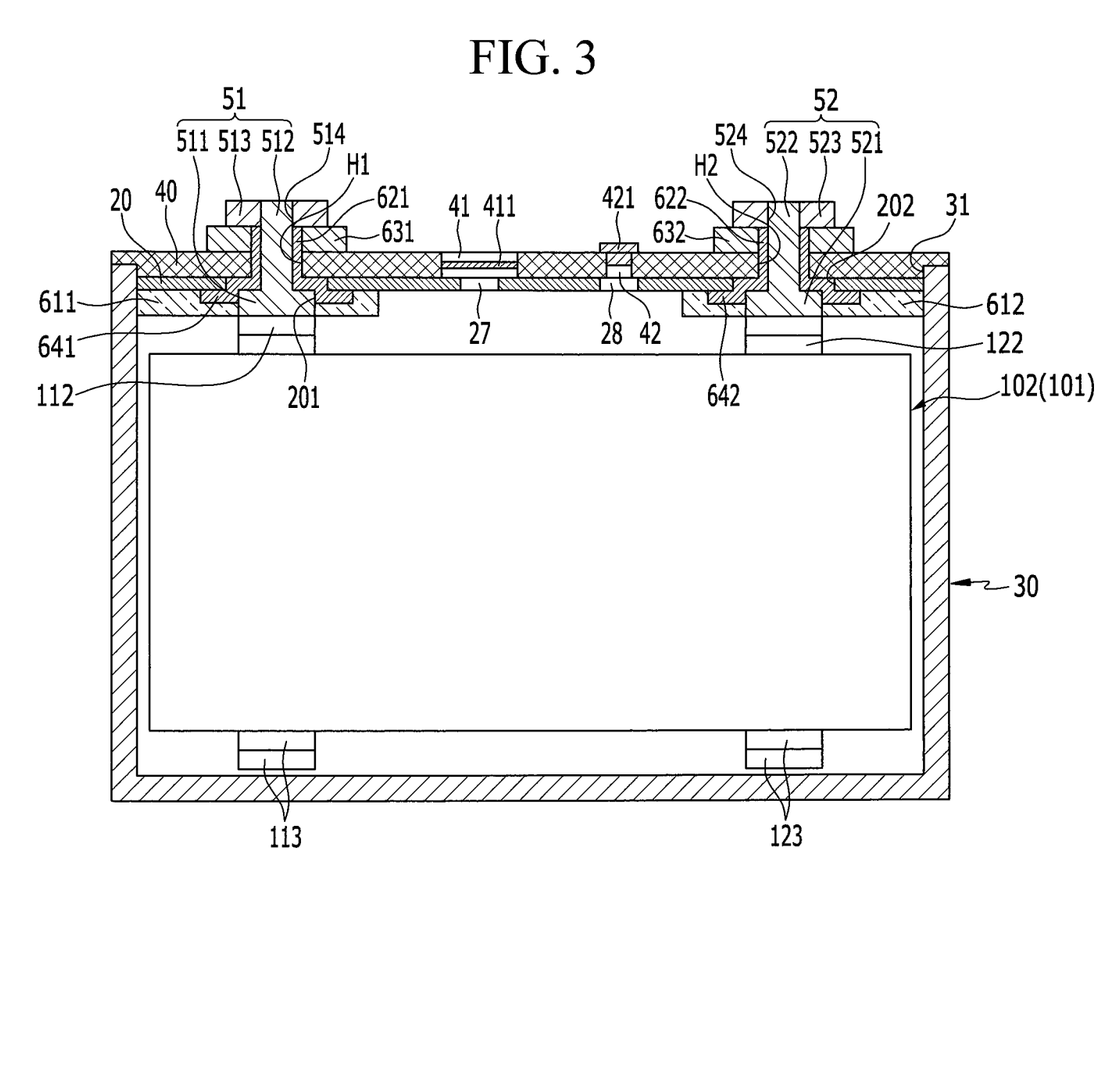
FIG. 3 is a cross-sectional view of FIG. 1 taken along the line III-III.

FIG. 1 is a perspective view of a rechargeable battery according to one or more exemplary embodiments of the present invention, FIG. 2 is a cross-sectional view of FIG. 1 taken along the line II-II, and FIG. 3 is a cross-sectional view of FIG. 1 taken along the line III-III.

Referring to FIGS. 1 to 3, the rechargeable battery according to one or more exemplary embodiments of the present invention includes: a pair of electrode assemblies 101 and 102 through which a current is charged and discharged; a case 30 in which the electrode assemblies 101 and 102 are accommodated; a cap plate 40 combined to the case 30 at an opening 31 of the case 30 to close and seal the opening 31; and first and second electrode terminals 51 and 52 respectively connected (e.g., electrically connected) to the electrode assemblies 101 and 102.

In addition, the rechargeable battery according to the present exemplary embodiment further includes an insulating plate 20 that is provided on the pair of electrode assemblies 101 and 102. The insulating plate 20 electrically insulates the electrode assemblies 101 and 102 from the cap plate 40 and the first and second electrode terminals 51 and 52.

Figure 4:
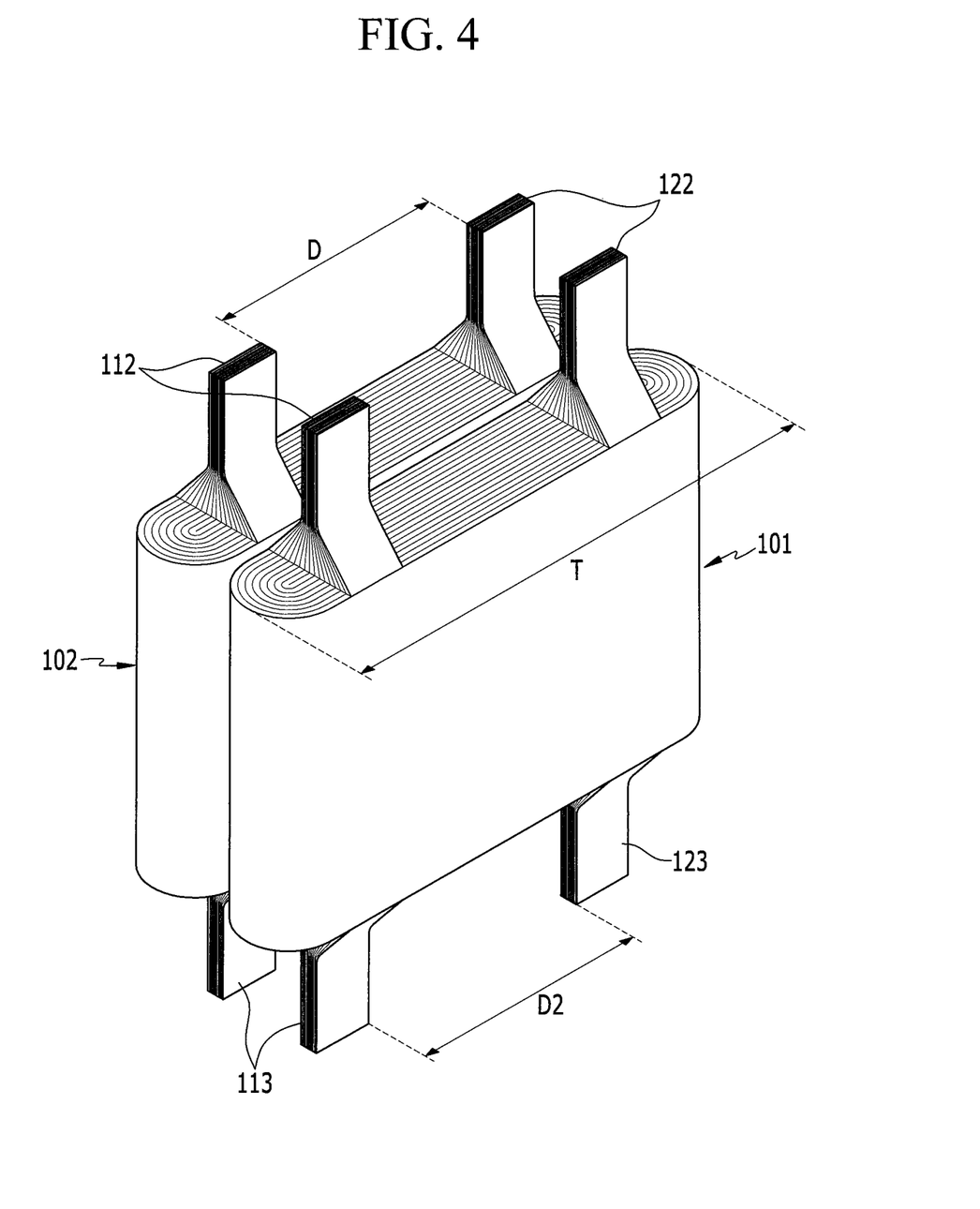
FIG. 4 is a perspective view of electrode assemblies of FIG. 2.
Figure 5:
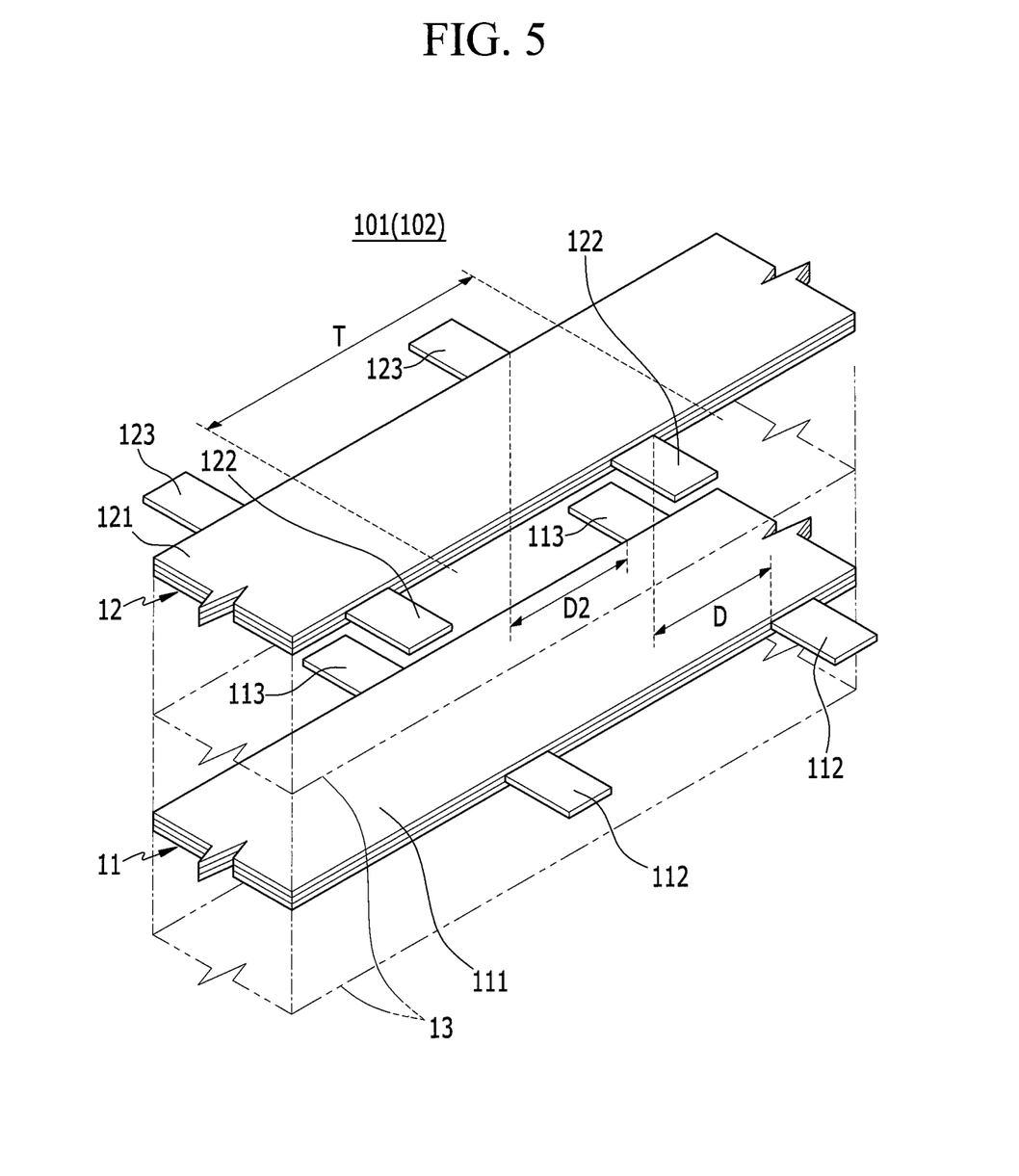
FIG. 5 is an exploded perspective view of the electrode assemblies illustrated in FIG. 4.

FIG. 4 is a perspective view of the electrode assemblies 101 and 102 of FIG. 2, and FIG. 5 is an exploded perspective view of the electrode assemblies 101 and 102 illustrated in FIG. 4.

Referring to FIGS. 4 and 5, the electrode assemblies 101 and 102 are formed by including a first electrode 11 (for example, a negative electrode) and a second electrode 12 (for example, a positive electrode) at opposite sides of a separator 13 that includes an electrically insulating material, and then winding the negative electrode 11, the separator 13, and the positive electrode 12.

In some exemplary embodiments, the electrode assemblies 101 and 102 are formed as a pair, but a larger number of electrode assemblies may be formed. The electrode assemblies 101 and 102 may have a plate shape with rounded (or oval) ends (e.g., upper and lower ends of FIG. 4) such that they may be accommodated in the case 30.

The negative and positive electrodes 11 and 12 respectively include coated regions 111 and 121 where an active material is coated on current collectors of a thin metal foil (e.g., copper or aluminum foil), and tabs 112 and 122, which are formed as exposed current collectors, and thus form uncoated regions because an active material is not coated thereon.

The tabs 112 and 122 are at respective ends of the wound electrode assemblies 101 and 102, are separated from each other by a distance D, and are located within one winding range T of the electrode assemblies 101 and 102. In other words, the tabs 112 of the negative electrodes 11 are at one side of one end of the wound electrode assemblies 101 and 102, and the tabs 122 of the positive electrodes 12 are at the other end of the wound electrode assemblies 101 and 102, and respective ones of the tabs 112 and 122 are separated by the distance D.

Accordingly, when the negative and positive electrodes 11 and 12 are wound, the tabs 112 of the negative electrodes 11 are disposed to one side (e.g., to the left side) of one wound end of the electrode assemblies 101 and 102 (see upper end of FIG. 4), and the tabs 122 of the positive electrodes 12 are disposed to the other side (e.g., to the right side) of the same end of the electrode assemblies 101 and 102 (see upper end of FIG. 4).

As such, in the negative and positive electrodes 11 and 12, as areas of the tabs 112 and 122 (which are the uncoated regions) are reduced (or minimized) and areas of the coated regions 111 and 121 are increased (or maximized), capacity of the electrode assemblies 101 and 102 can be increased.

The negative and positive electrodes 11 and 12 further include connecting tabs 113 and 123 that are formed as uncoated regions. In one or more exemplary embodiments, the connecting tabs 113 and 123 respectively protrude from the coated regions 111 and 121 of the negative and positive electrodes 11 and 12 at a side opposite to the side having the tabs 112 and 122. The connecting tabs 113 and 123 are separated from each other by a distance D2, and are located within one winding range T of the wound electrode assemblies 101 and 102.

That is, the connecting tabs 113 of the negative electrode 11, which are at one side of one end of the pair of the wound electrode assemblies 101 and 102, and the connecting tabs 123 of the positive electrode 12 are separated from respective ones of each other by the distance D2 at the other end of the wound electrode assemblies 101 and 102.

As an example, the tabs 112 and 122 of the negative and positive electrodes 11 and 12 extend toward (or are located near) the cap plate 40, and overlap each other such that they are respectively electrically coupled. The connecting tabs 113 and 123 are disposed at the sides of the electrode assemblies 101 and 102 that are opposite the cap plate 40, and overlap each other such that they are respectively electrically coupled.

Figure 6:
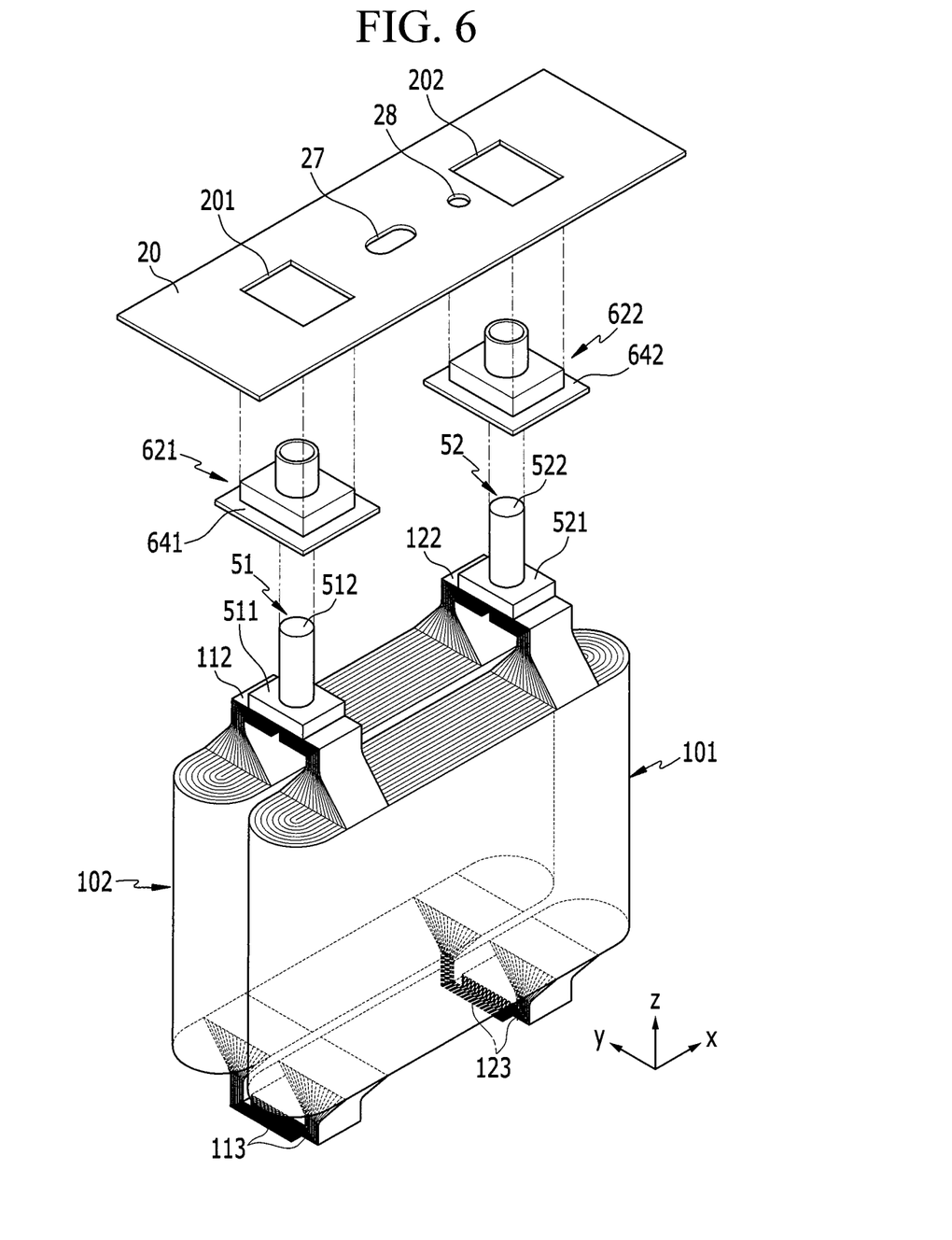
FIG. 6 is a partially exploded perspective view of some of the components of the rechargeable battery of FIG. 1.

FIG. 6 is a partially exploded perspective view some of the components of the rechargeable battery according to one or more embodiments of the present invention. Referring to FIGS. 2 and 6, the two electrode assemblies 101 and 102 are parallel to each other, and are electrically connected in parallel to each other.

In other words, in the two electrode assemblies 101 and 102, the tab 112 of one negative electrode 11 of one of the electrode assemblies and the tab 112 of the other negative electrode 11 of the other one of the electrode assemblies face each other and are bent to be connected to each other at a first electrode terminal 51, and the tab. 122 of one positive electrode 12 of one of the electrode assemblies and the tab 122 of the other positive electrode 12 of the other one of the electrode assemblies face each other and are bent to be connected to each other at a second electrode terminal 52.

Further, in the two electrode assemblies 101 and 102, the connecting tab 113 of one negative electrode 11 of one of the electrode assemblies and the connecting tab 113 of the other negative electrode 11 of the other one of the electrode assemblies face each other and are bent to be connected to each other while overlapping each other, and the connecting tab 123 of the one positive electrode 12 of one of the electrode assemblies and the connecting tab 123 of the other positive electrode 12 of the other one of the electrode assemblies face each other and are bent to be connected to each other while overlapping each other. That is, the connecting tabs 113 and 123 connect the pair of electrode assemblies 101 and 102 in parallel.

Accordingly, in the pair of electrode assemblies 101 and 102, the negative and positive electrodes 11 and 12 are respectively electrically connected to each other via the tabs 112 and 122 and via the connecting tabs 113 and 123. That is, the electrode assemblies 101 and 102 have a current path that is formed by the tabs 112 and 122 and the connecting tabs 113 and 123, respectively.

Referring back to FIGS. 1, 2, 3, and 6, the case 30 accommodates the electrode assemblies 101 and 102 and the insulating plate 20 therein, forms an external appearance of the rechargeable battery, and provides mechanical strength to the rechargeable battery. The case 30 defines a space in which at least two of the plate-shaped electrode assemblies 101 and 102 are accommodated.

For example, the case 30 substantially has a cuboid shape and includes a quadrangular opening 31 into which the electrode assemblies 101 and 102 are inserted, a bottom that faces the opening 31 at an opposite side of the case 30, and two wide side walls and two narrow side walls between the opening 31 and the bottom.

The insulating plate 20 includes, or defines, internal terminal openings (e.g., internal terminal holes) 201 and 202 that respectively correspond to terminal openings (e.g., terminal holes) H1 and H2 formed in the cap plate 40. Accordingly, the first and second electrode terminals 51 and 52 (e.g., negative and positive electrode terminals) and gaskets 621 and 622, which are respectively connected to the tabs 112 and 122 of the electrode assemblies 101 and 102 accommodated inside the case 30, and which respectively pass through the internal terminal holes 201 and 202 of the insulating plate 20 and are drawn out of the insulating plate 20.

That is, while electrically insulating the electrode assemblies 101 and 102 from the cap plate 40, the insulating plate 20 allows the negative and positive electrode terminals 51 and 52, which respectively pass through the internal terminal holes 201 and 202 to be connected to the tabs 112 and 122, to be drawn to the outside.

The cap plate 40 is combined to the case 30 at the opening 31 of the case 30 to close and seal the case 30, and includes the two terminal holes H1 and H2. For example, the negative and positive electrode terminals 51 and 52 are provided in the terminal holes H1 and H2 and in the internal terminal holes 201 and 202, respectively. For example, the case 30 and the cap plate 40 may be made of aluminum such that they are welded together in the opening 31.

In addition, the cap plate 40 further includes a vent opening (e.g., a vent hole) 41 and an electrolyte injection opening 42. The vent hole 41 is closed and sealed by a vent plate 411 so as to discharge internal pressure associated with the gas generated inside the rechargeable battery due to charging and discharging operations of the electrode assemblies 101 and 102.

For example, when the internal pressure of the rechargeable battery reaches a predetermined pressure, the vent plate 411 may rupture to open the vent hole 41, thereby discharging the gas and the internal pressure. The vent plate 411 has a notch 412 that facilitates (or guides) the rupture.

The electrolyte injection opening 42 enables an electrolyte solution to be injected into the case 30 after the cap plate 40 is combined and welded to the case 30. After injecting the electrolyte solution, the electrolyte injection opening 42 is sealed by a sealing cap 421.

The negative and positive electrode terminals 51 and 52 are respectively connected to the tabs 112 and 122 of the electrode assemblies 101 and 102, allowing a current to discharge or charge the electrode assemblies 101 and 102.

In an internal space defined by the case 30 and the cap plate 40, the insulating plate 20 between the cap plate 40 and the electrode assemblies 101 and 102 protects the electrode assemblies 101 and 102 from being crushed by the cap plate 40 that is pushed into the case 30 in a z-axis direction.

The insulating plate 20 includes an internal vent opening (e.g., an internal vent hole) 27. The internal vent hole 27, which corresponds to the vent hole 41 provided in the cap plate 40, may transmit and discharge the increased internal pressure associated with the gas generated from the electrode assemblies 101 and 102 to the vent hole 41.

The insulating plate 20 also includes, or defines, an internal electrolyte injection opening 28. The internal electrolyte injection opening 28 corresponds to the electrolyte injection opening 42 provided in, or defined by, the cap plate 40, and allows the electrolyte solution injected via the electrolyte injection opening 42 to be injected through the insulating plate 20.

The negative and positive electrode terminals 51 and 52 respectively pass through the internal terminal holes 201 and 202 of the insulating plate 20 and the terminal holes H1 and H2 of the cap plate 40, and are electrically coupled to the electrode assemblies 101 and 102 via the tabs 112 and 122, respectively.

The tabs 112 and 122 are connected to an inner side of the insulating plate 20, i.e., respectively connected to the negative and positive electrode terminals 51 and 52 that are respectively provided in the internal terminal holes 201 and 202 at opposite sides of the cap plate 40. In some embodiments, the tabs 112 and 122 are bent to be parallel to the cap plate 40, and are respectively welded to the negative and positive electrode terminals 51 and 52.

The negative and positive electrode terminals 51 and 52 may have the same or substantially the same structure. Referring to the drawings, the negative and positive electrode terminals 51 and 52 respectively include internal plates 511 and 521, pillar portions 512 and 522, and external plates 513 and 523.

The internal plates 511 and 521 have an area that is larger than the pillar portions 512 and 522, and are respectively welded to the tabs 112 and 122 with the larger area, and are located inside the case 30 inward of the cap plate 40 and the insulating plate 20. In some embodiments, in the two electrode assemblies 101 and 102, the tabs 112 and 112 and the tabs 122 and 122 are respectively bent while facing each other, and the pairs of tabs 112 and 122 are then welded to the internal plates 511 and 521, respectively.

The pillar portions 512 and 522 are respectively connected to the internal plates 511 and 521, respectively pass through the internal terminal holes 201 and 202 and the terminal holes H1 and H2 along with the gaskets 621 and 622, and protrude out of the cap plate 40.

The external plates 513 and 523 are respectively electrically coupled to the pillar portions 512 and 522 at an external surface of the cap plate 40. The pillar portions 512 and 522 are respectively connected to the external plates 513 and 523 by caulking or welding.

Accordingly, the electrode assemblies 101 and 102 may be respectively drawn out of the case 30 via the tabs 112 and 122 and the negative and positive electrode terminals 51 and 52. The tabs 112 and 122 are directly connected to the negative and positive electrode terminals 51 and 52, respectively, thereby making it simple to draw the electrode assemblies 101 and 102 out of the case 30.

The gaskets 621 and 622 are respectively interposed between the cap plate 40 and the negative and positive electrode terminals 51 and 52, and are respectively interposed between the insulating plate 20 and the negative and positive electrode terminals 51 and 52, thereby electrically insulating and sealing between the negative and positive electrode terminals 51 and 52 and the cap plate 40, and thereby sealing between the negative and positive electrode terminals 51 and 52 and the insulating plate 20.

The gaskets 621 and 622 are respectively provided between the pillar portions 512 and 522 of the negative and positive electrode terminals 51 and 52 and inner surfaces of the terminal holes H1 and H2 of the cap plate 40, thereby sealing and electrically insulating between the pillar portions 512 and 522 and the terminal holes H1 and H2 of the cap plate 40.

The gaskets 621 and 622 are also respectively provided between the pillar portions 512 and 522 of the negative and positive electrode terminals 51 and 52 and inner surfaces of the internal terminal holes 201 and 202 of the insulating plate 20, thereby sealing between the pillar portions 512 and 522 and the internal terminal holes 201 and 202 of the insulating plate 20.

In some embodiments, one side of each of internal insulating members 611 and 612 is closely attached to the insulating plate 20, while the other side thereof partially encloses the internal plates 511 and 521 of the negative and the positive electrode terminals 51 and 52 and the gaskets 621 and 622, respectively, thereby stabilizing a connecting structure between the negative and positive electrode terminals 51 and 52, the tabs 112 and 122, and the gaskets 621 and 622, respectively.

The gaskets 621 and 622 include support flanges 641 and 642 that protrude outwardly from the negative and positive electrode terminals 51 and 52, respectively. The support flanges 641 and 642 respectively support surrounding areas of the internal terminal holes 201 and 202 of the insulating plate 20.

More specifically, the support flanges 641 and 642 respectively accommodate the internal plates 511 and 521, protrude outwardly from the internal plates 511 and 521, and support the surrounding areas of the internal terminal holes 201 and 202 of the insulating plate 20.

As such, the internal insulating members 611 and 612 respectively accommodate and support the negative and positive electrode terminals 51 and 52, and respectively support the surrounding areas of the internal terminal holes 201 and 202 of the insulating plate 20, the gaskets 621 and 622, and the support flanges 641 and 642.

After the pillar portions 512 and 522 are respectively inserted into the internal terminal holes 201 and 202 and into the terminal holes H1 and H2, while interposing the gaskets 621 and 622 therebetween, and are respectively inserted into coupling openings (e.g., coupling holes) 514 and 524 of the external plates 513 and 523 with external insulating members 631 and 632 respectively interposed therebetween, surrounding areas of the coupling holes 514 and 524 are caulked or welded to fix the pillar portions 512 and 522 to the external plates 513 and 523, respectively. Accordingly, the negative and positive electrode terminals 51 and 52 can be provided in the cap plate 40.

That is, the support flanges 641 and 642 of the gaskets 621 and 622 further respectively seal between the internal insulating members 611 and 612 and the insulating plate 20, and between the internal insulating members 611 and 612 and the cap plate 40.

When the negative and positive electrode terminals 51 and 52 are provided in the cap plate 40, the gaskets 621 and 622 prevent the electrolyte solution from leaking through the internal terminal holes 201 and 202 and the terminal holes H1 and H2. In addition, the gaskets 621 and 622 may further extend between the external insulating members 631 and 632 and the pillar portions 512 and 522 to further seal therebetween.

In the rechargeable battery of the present exemplary embodiment, when a current charges and discharges the pair of electrode assemblies 101 and 102 via the negative and positive electrode terminals 51 and 52 and the tabs 112 and 122, respectively, current density concentrated on the tabs 112 and 122 can be distributed because the connecting tabs 113 and 123 further electrically connect the electrode assemblies 101 and 102.

Accordingly, in the electrode assemblies 101 and 102, current density can be uniformly distributed to the tabs 112 and 122 and the connecting tabs 113 and 123. That is, a temperature difference between positions in the electrode assemblies 101 and 102 can be reduced. In the rechargeable battery, heat concentrated on the negative and positive electrode terminals 51 and 52 and the tabs 112 and 122 can be prevented, or the likelihood thereof may be reduced, and a service life of a cell can be extended because degradation of the cell is prevented or reduced.

A rechargeable battery according to one or more exemplary embodiments of the present invention is described below. A description of the same or similar components as those described above may be omitted, while different components are described.

Figure 7:
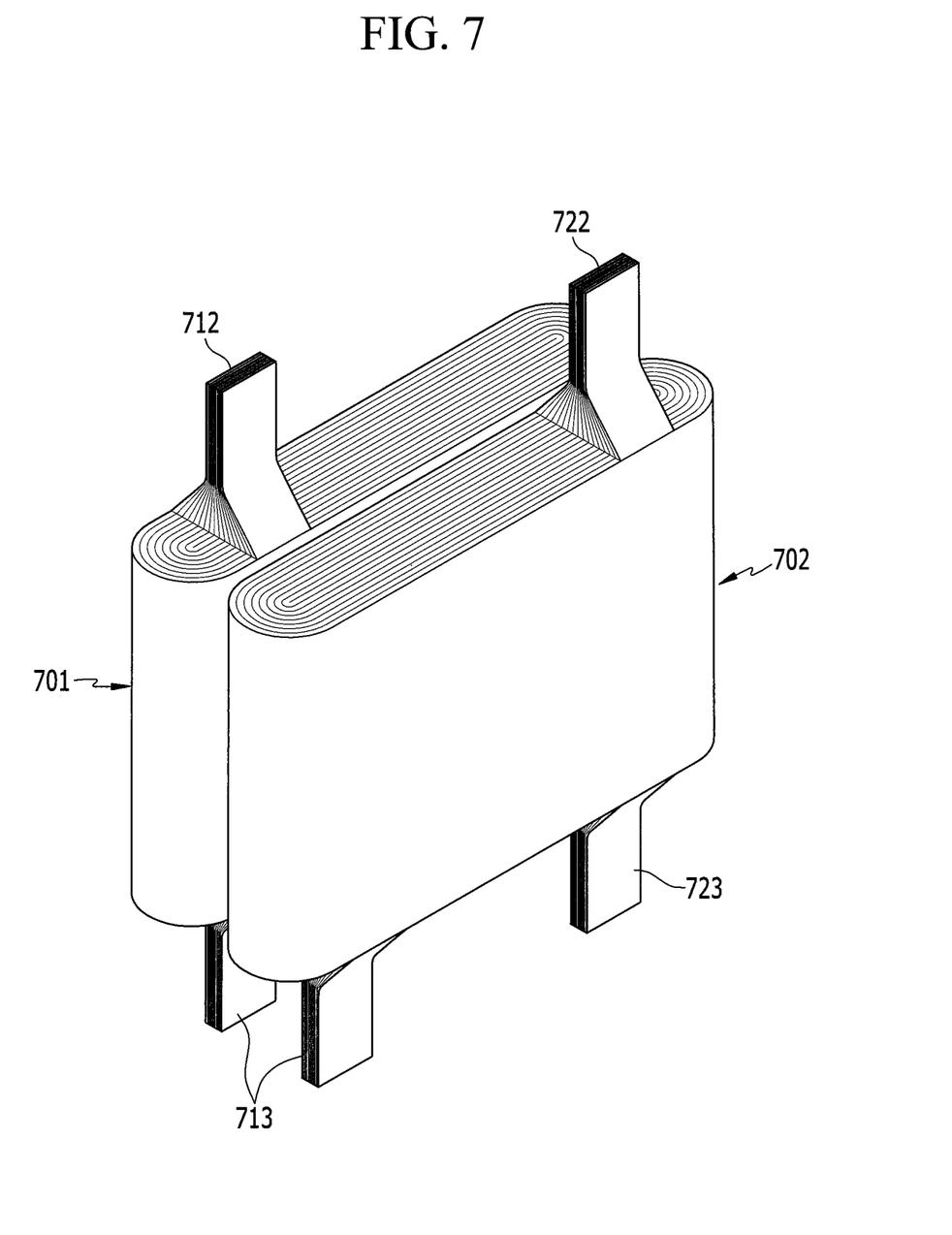
FIG. 7 is a perspective view of electrode assemblies of a rechargeable battery according to one or more exemplary embodiments of the present invention.
Figure 8:
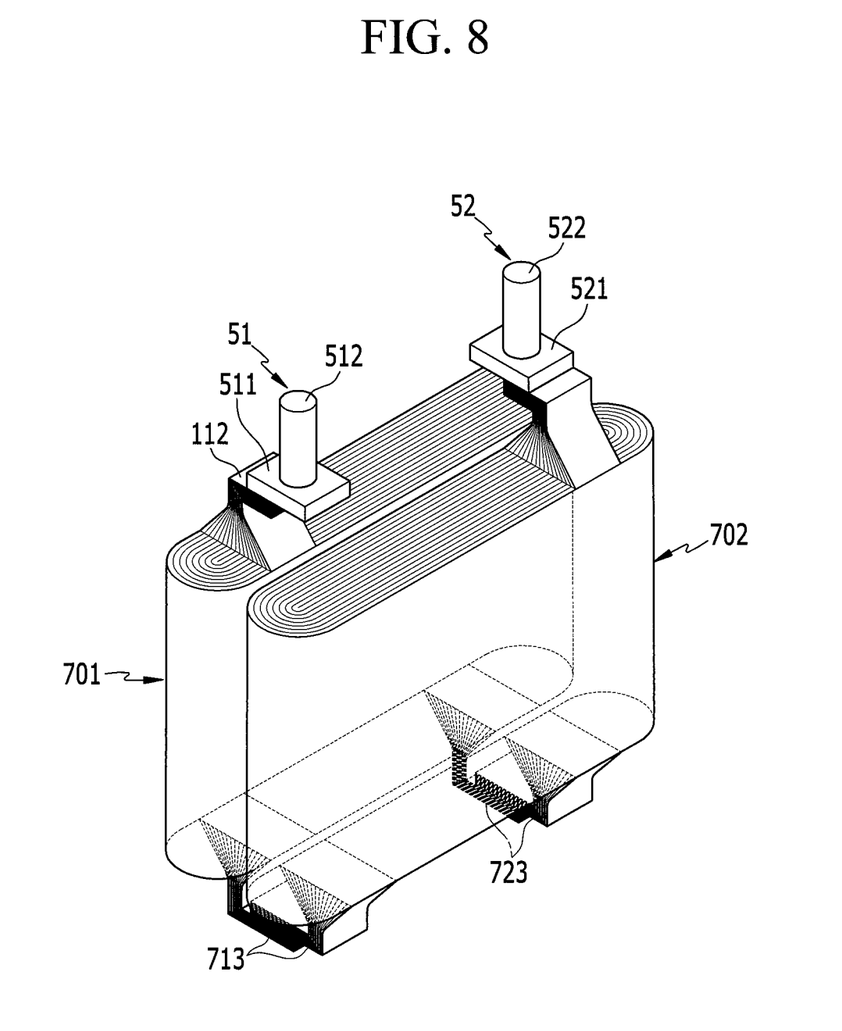
FIG. 8 is a perspective view of the electrode assemblies of FIG. 7 and negative and positive electrode terminals connected thereto.

FIG. 7 is a perspective view of electrode assemblies applicable to a rechargeable battery according to one or more exemplary embodiments, and FIG. 8 is a perspective view of the electrode assemblies of FIG. 7 to which negative and positive electrode terminals are connected.

Referring to FIGS. 7 and 8, in the rechargeable battery according to one or more exemplary embodiments of the present invention, a tab 712 of a negative electrode 11 is formed in one electrode assembly 701 of a pair of electrode assemblies 701 and 702, and is connected to a negative terminal 51, and a tab 722 of a positive electrode 12 is formed in the other electrode assembly 702 of the pair of electrode assemblies 701 and 702, and is connected to a positive electrode terminal 52.

In some embodiments, the pair of electrode assemblies 701 and 702 respectively allow a current flow between the tabs 712 and 722 of the negative and positive electrode terminals 51 and 52 via connecting tabs 713 and 723 of the negative and positive electrodes 11 and 12, respectively. Accordingly, an effect of distributing current density via the pair of electrode assemblies 701 and 702 may be further enhanced. That is, a temperature difference between positions inside the electrode assemblies 701 and 702 can be further reduced.

In addition, balanced charging and discharging occurs between the pair of electrode assemblies 701 and 702. Accordingly, the temperature difference generated between the electrode assemblies 701 and 702 can be reduced or minimized.

While this disclosure has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims and their equivalents.

Description of Some of the Symbols of Exemplary Embodiments

| | |
|---|---|
| 11: first electrode (negative electrode) | 12: second electrode (positive electrode) |
| 13: separator | 20: insulating plate |
| 27: internal vent hole | 28: internal electrolyte injection opening |
| 30: case | 31: opening |
| 40: cap plate | 41: vent hole |
| 42: electrolyte injection opening | |
| 51, 71: first electrode (negative electrode) terminal | |
| 52, 72: second electrode (positive electrode) terminal | |

Description of Some of the Symbols of Exemplary Embodiments

| | |
|---|---|
| 101, 102, 701, 702: electrode assembly | |
| 111, 121: coated region | 112, 122, 712, 722: tab |
| 113, 123, 713, 723: connecting tab | 201, 202: internal terminal hole |
| 411: vent plate | 412: notch |
| 421: sealing cap | 511, 521: internal plate |
| 512, 522: pillar portion | 513, 523: external plate |
| 514, 524: coupling hole | 621, 622: gasket |
| 631, 632: external insulating member | 641, 642: support flange |
| D, D2: distance | H1, H2: terminal hole |
| T: one winding range | |

What is claimed is:

1. A rechargeable battery comprising:
    a pair of electrode assemblies, each comprising:
        a first electrode comprising a coated region, a tab, and a connecting tab;
        a second electrode comprising a coated region, a tab, and a connecting tab; and
        a separator between the first electrode and the second electrode, the first electrode, the separator, and the second electrode being wound;
    a case accommodating the pair of electrode assemblies, the pair of electrode assemblies being non-collinearly parallel;
    a cap plate at an opening of the case and defining terminal openings; and
    first and second electrode terminals respectively connected to the tabs of the first and second electrodes and respectively passing through the terminal openings,
    wherein the connecting tabs are respectively drawn out of the pair of electrode assemblies to face each other;
    wherein the connecting tabs protrude from the air of electrode assemblies in a direction opposite to that of the tabs;
    wherein the pair of electrode assemblies are electrically connected to each other via the connecting tabs.

2. The rechargeable battery of claim 1, wherein the connecting tabs connect the pair of electrode assemblies in parallel.

3. The rechargeable battery of claim 1, wherein the tabs of the first electrodes and the tabs of the second electrodes are located near the cap plate, and
    wherein the connecting tabs are located at a side of the electrode assemblies opposite the cap plate.

4. The rechargeable battery of claim 3, wherein respective ones of the connecting tabs are bent, overlapped, and connected to each other.

5. The rechargeable battery of claim 1, wherein the tabs of the first electrodes are located at one side of the pair of electrode assemblies to be connected to the first electrode terminal, and
    wherein the tabs of the second electrodes are located at an opposite side of the pair of electrode assemblies to be connected to the second electrode terminal.

6. The rechargeable battery of claim 1, further comprising an insulating plate that is above the pair of electrode assemblies, and that defines internal terminal openings that correspond to the terminal openings.

7. The rechargeable battery of claim 1, wherein the case has a length in a first direction, a width in a second direction, and a height in a third direction, the length of the case being greater than the width of the case, and
    wherein the electrode assemblies are stacked along the second direction.

8. The rechargeable battery of claim 1, wherein the tabs of the first and second electrodes protrude from the coated region in a direction toward the cap plate.

\* \* \* \* \*

UNITED STATES PATENT AND TRADEMARK OFFICE
CERTIFICATE OF CORRECTION

PATENT NO. : 9,941,503 B2
APPLICATION NO. : 15/002338
DATED : April 10, 2018
INVENTOR(S) : Yun-Ki Baik et al.

It is certified that error appears in the above-identified patent and that said Letters Patent is hereby corrected as shown below:

In the Claims

Column 10, Line 35, Claim 1   delete "air"
                              insert -- pair --

Signed and Sealed this
Tenth Day of September, 2019

Andrei Iancu
*Director of the United States Patent and Trademark Office*